(12) United States Patent
Causa et al.

(10) Patent No.: US 6,653,387 B2
(45) Date of Patent: Nov. 25, 2003

(54) ALUMINA REINFORCED RUBBER COMPOSITION WHICH CONTAINS TETRATHIODIPROPIONIC AND/OR TRITHIODIPROPIONIC ACID COUPLING AGENT AND ARTICLE OF MANUFACTURE, INCLUDING A TIRE, HAVING AT LEAST ONE COMPONENT COMPRISED OF SUCH RUBBER COMPOSITION

(75) Inventors: Alfredo Guillermo Causa, Akron, OH (US); Lawson Gibson Wideman, Hudson, OH (US); Glen Hargis, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 43 days.

(21) Appl. No.: 09/964,038

(22) Filed: Sep. 26, 2001

(65) Prior Publication Data

US 2003/0060572 A1 Mar. 27, 2003

(51) Int. Cl.$^7$ .................................................. C08L 1/00
(52) U.S. Cl. ....................... 524/437; 524/247; 524/249; 524/492; 524/502; 524/571
(58) Field of Search ................................ 524/437, 247, 524/249, 502, 492

(56) References Cited

U.S. PATENT DOCUMENTS

| | | | | |
|---|---|---|---|---|
| 4,229,333 | A | * 10/1980 | Wolff et al. | 524/571 |
| 5,130,363 | A | 7/1992 | School et al. | 524/392 |
| 5,336,730 | A | 8/1994 | Sandstrom et al. | 525/332.6 |
| 5,391,665 | A | * 2/1995 | Matsunaga et al. | 526/211 |
| 5,605,951 | A | 2/1997 | Sandstrom et al. | 524/494 |
| 5,714,533 | A | * 2/1998 | Hatakeyama et al. | 524/140 |
| 5,733,963 | A | 3/1998 | Sandstrom et al. | 524/492 |
| 5,883,139 | A | * 3/1999 | Wideman et al. | 521/43.5 |
| 5,900,449 | A | 5/1999 | Custodero et al. | 524/430 |
| 6,040,389 | A | * 3/2000 | Wideman et al. | 525/332.6 |
| 6,230,777 | B1 | 5/2001 | Hedlund et al. | 156/433 |

* cited by examiner

Primary Examiner—David W. Wu
Assistant Examiner—Henry S. Hu
(74) Attorney, Agent, or Firm—Henry C. Young, Jr.

(57) ABSTRACT

This invention relates to a conjugated diene-based rubber composition reinforced with particulate alumina in combination with a non-silane coupling agent as tetrathiodipropionic acid and/or trithiodipropionic acid. The invention includes an article of manufacture, including a tire, having at least one component comprised of such rubber composition.

14 Claims, No Drawings

ALUMINA REINFORCED RUBBER COMPOSITION WHICH CONTAINS TETRATHIODIPROPIONIC AND/OR TRITHIODIPROPIONIC ACID COUPLING AGENT AND ARTICLE OF MANUFACTURE, INCLUDING A TIRE, HAVING AT LEAST ONE COMPONENT COMPRISED OF SUCH RUBBER COMPOSITION

FIELD OF THE INVENTION

This invention relates to a conjugated diene-based rubber composition reinforced with particulate alumina in combination with a non-silane coupling agent as a high purity tetrathiodipropionic acid and/or trithiodipropionic acid. The invention includes an article of manufacture, including a tire, having at least one component comprised of such rubber composition.

BACKGROUND FOR THE INVENTION

For various applications utilizing rubber compositions, carbon black and/or synthetic amorphous silica-based materials are conventionally used as particulate reinforcing fillers for the elastomer(s) of the rubber composition(s).

Often an organosilane-based coupling agent such as, for example, an organoalkoxysilane-based polysulfide coupling agent is used together with precipitated silica or with alumina in order to couple, or otherwise enhance, its elastomer reinforcement effect for the elastomer(s) and such use of a coupling agent is well known to those having skill in such art (e.g. a bis(3-triethoxysilylpropyl)polysulfide having an average of from 2 to 2.6 or from 3.5 to 4 connecting sulfur atoms in its polysulfidic bridge.

However, use of such alkoxysilane-based silane coupling agent normally results in a release of an alcohol (e.g. ethanol), as a byproduct, by reaction of the alkoxy groups of the silane with hydroxyl groups contained on the surface of aggregates of synthetic precipitated silica, particularly during a rubber mixing process where rubber, precipitated silica and such type of coupling agent are mixed together.

For various purposes, it may be desired to reduce or substantially eliminate, or even entirely eliminate such alcohol evolution while mixing with various rubber compositions.

It is also appreciated that particulate alumina, particularly a natural occurring alumina such as, for example, Boehmite alumina as an aluminum oxide hydroxide comprised of the general formula: $Al_2O_3 \cdot xH_2O$, has heretofore been proposed for blending with various rubber compositions where the "x" indicates that water of hydration is contained on or with the aluminum oxide in an amount of "x" units of water which can vary significantly such as for example only, from one to perhaps three or more units of water. Such water of association is well known to those having skill in such art. It is considered herein that such alumina contains hydroxyl groups on its surface.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with one aspect of this invention, a rubber composition is provided which comprises, based on parts by weight per 100 parts by weight rubber (phr):

(A) 100 parts by weight of at least one diene hydrocarbon based elastomer,
(B) about 25 to about 100, optionally about 35 to about 90, phr of particulate reinforcing filler comprised of
  (1) about 25 to about 100, alternately about 25 to about 70, phr of particulate alumina as an aluminum oxide hydroxide, which contains hydroxyl groups on its surface, comprised of the general formula (I):

$$Al_2O_3 \cdot xH_2O \qquad (I)$$

where x represents a degree of water association with said aluminum oxide and is typically a value in a range of from zero to about 3, more often from about 1 to about 3, and, correspondingly,
  (2) from zero to about 30, alternately about 5 to about 25, phr of rubber reinforcing particulate carbon black; and/or aggregates of precipitated silica, and
(C) about 0.01 to about 10, alternately about 1 to about 5, phr of a coupling agent for said alumina selected from tetrathiodipropionic acid and/or trithiodipropionic acid;
wherein said coupling agent and said alumina are mixed with said elastomer(s), according to one or more of the following:
  (1) mixing said tetrathiodipropionic acid and/or trithiodipropionic acid together with said particulate alumina in said elastomer(s), preferably in an internal rubber mixer; or
  (2) pre-reacting said tetrathiodipropionic acid and/or trithiodipropionic acid with said particulate alumina to form an alumina composite thereof and thereafter mixing said alumina composite with said elastomer(s), preferably in an internal rubber mixer.

Preferably, such rubber composition is exclusive of silica and organosilane based coupling agents, particularly synthetic precipitated silica and bis(3-triethoxysilylpropyl) polysulfide coupling agent and particularly such coupling agent having an average of from 2 to 2.6 or from 3.5 to 4 connecting sulfur groups in its polysulfidic bridge.

In further accordance with this invention, an article of manufacture is provided which contains at least one component comprised of the rubber composition of this invention.

In additional accordance with this invention, a tire is provided which contains at least one component comprised of the rubber composition of this invention. Such tire component may be, for example, a tire tread.

Thus, in further accordance with this invention, a tire is provided having a tread comprised of the rubber composition of this invention.

The said particulate synthetic alumina may be comprised of Boehmite alumina. Such naturally occurring alumina is well known and can be obtained, for example, as Pural 200 or Catapal Alumina from Sasol North America Inc.

The alumina can be dried prior to its use, if desired, to remove adsorbed water. This can normally be accomplished by heating the alumina to a temperature in a range, for example, of about 100° C. to about 200° C. in a nitrogen, or otherwise inert, atmosphere for a suitable period of time, for example, from one to 10 hours.

It is preferred that the tetrathiodipropionic acid is of relatively high purity of at least about 85 percent and preferably in a range of about 85 percent to about 95 percent in order to readily couple the alumina to the diene based elastomer(s) in the rubber composition. Such high purity tetrathiodipropionic acid might be obtained, for example, by allowing sulfur monochloride to react at 0° C. with 3-mercaptopropionic acid in a dry toluene solution.

In practice, the alumina may, for example, be (A) pre-reacted with said tetrathiodipropionic acid and/or trithiodipropionic acid to from an alumina composite thereof prior to addition to said elastomer(s), or (B) mixed individually to said elastomer(s) wherein said tetrathiodipropionic acid and/or trithiodipropionic acid are added to the elastomer(s) subsequent to the addition of the alumina.

While the mechanism might not be entirely understood, it is envisioned herein that the alumina and tetrathiodipropionic acid, and/or trithiodipropionic acid interact in situ within the elastomer host to form an alumina coupler by a carboxylate complex with the alumina, and a sulfide bond attachment to the diene-based elastomer of the rubber composition. Thereby a coupling effect is created to couple the alumina to at least one of said elastomers without an evolution of alcohol and to thereby provide reinforcement for the rubber composition.

Alternately, the alumina and tetrathiodipropionic acid and/or trithiodipropionic acid may be added as a pre-reacted composite thereof.

Such pre-reacted composite, sometimes referred to herein as an alumina composite, may be prepared, for example, by heating 1000 g of said Pural 200 white fine alumina (SA 100 m$^2$/g) at 150° C. for 24 hours in a four liter stainless steel beaker, followed by cooling to room temperature, or about 23° C., under a nitrogen atmosphere, then adding 27 g of pure S4 tetrathiodipropionic acid dissolved in 946 ml of reagent acetone. The mixture is stirred and then, while stirring, stripped of the acetone at 40° C. under a reduced pressure of 29 inches of mercury to yield about 1010 grams of resulting pre-treated alumina.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas as hereinbefore discussed, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization of a particulate alumina in combination with tetrathiodipropionic acid and/or trithiodipropionic acid for reinforcement of an elastomer.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as alumina or said alumina composite as the case may be, and carbon black are mixed in one or more non-productive mix stages. The terms "non-productive" and "productive" mix stages are well known to those having skill in the rubber mixing art.

While various embodiments are disclosed herein for practicing the invention, it will be apparent to those skilled in this art that various changes and modifications may be made therein without departing from the spirit or scope of the invention.

What is claimed is:

1. A tire which contains at least one component of a rubber composition comprised of, based on parts by weight per 100 parts by weight rubber (phr):

(A) at least one diene hydrocarbon based elastomer,
   (B) about 25 to about 100 phr of particulate reinforcing filler comprised of
      (1) about 25 to about 100 phr of particulate alumina as an aluminum oxide hydroxide, which contains hydroxyl groups on its surface, comprised of the general formula (I):

   $$Al_2O_3 \cdot xH_2O \qquad (I)$$

where x represents a degree of water association with said aluminum oxide in a range of zero to about 3, and, correspondingly,
      (2) from zero to about 30 phr of rubber reinforcing particulate carbon black and/or aggregates of precipitated silica, and
   (C) about 0.01 to about 10 phr of a coupling agent for said alumina selected from tetrathiodipronionic acid and/or trithiodinropionic acid;
   wherein said coupling agent and said alumina are mixed with said elastomer(s), according to one or more of the following:
      (1) mixing said tetrathiodipropionic acid and/or trithiodipropionic acid together with said particulate alumina in said elastomer(s), or
      (2) pre-reacting said tetrathiodipropionic acid and/or trithiodipropionic acid with said particulate alumina to form an alumina composite thereof and thereafter mixing said alumina composite with said elastomer(s).

2. A tire of claim 1 wherein said component is a tread.

3. The tire of claim 1 wherein said rubber composition is exclusive of silica and organosilane based coupling agents.

4. The tire of claim 1 wherein, for said rubber composition, said coupling agent is trithiodipropionic acid.

5. The tire of claim 1 wherein, for said rubber composition, said coupling agent is tetrathiodipropionic acid.

6. The tire of claim 1 wherein, for said rubber composition, said tetrathiodipropionic acid and/or trithiodipropionic acid is mixed with said alumina in said elastomer(s).

7. The tire of claim 1 wherein, for said rubber composition, wherein said tetrathiodipropionic acid and/or trithiodipropionic acid is mixed with the rubber subsequent to the addition of the alumina.

8. The tire of claim 1 wherein, for said rubber composition, said tetrathiodipropionic acid and/or trithiodipropionic acid are pre-reacted with said alumina to form an alumina composite thereof and thereafter said alumina composite is mixed with said elastomer(s).

9. The tire of claim 2 wherein said rubber composition is exclusive of silica and organosilane based coupling agents.

10. The tire of claim 2 wherein, for said rubber composition, said coupling agent is trithiodipropionic acid.

11. The tire of claim 2 wherein, for said rubber composition, said coupling agent is tetrathiodipropionic acid.

12. The tire of claim 2 wherein, for said rubber composition, said tetrathiodipropionic acid and/or trithiodipropionic acid is mixed with said alumina in said elastomer(s).

13. The tire of claim 2 wherein, for said rubber composition, wherein said tetrathiodipropionic acid and/or trithiodipropionic acid is mixed with the rubber subsequent to the addition of the alumina.

14. The tire of claim 2 wherein, for said rubber composition, said tetrathiodipropionic acid and/or trithiodipropionic acid are pre-reacted with said alumina to form an alumina composite thereof and thereafter said alumina composite is mixed with said elastomer(s).

* * * * *

UNITED STATES PATENT AND TRADEMARK OFFICE
CERTIFICATE OF CORRECTION

PATENT NO. : 6,653,387 B2
DATED : November 25, 2003
INVENTOR(S) : Alfredo Guillermo Causa et al.

It is certified that error appears in the above-identified patent and that said Letters Patent is hereby corrected as shown below:

Column 1,
Line 29, change "(e.g. a bis(3-triethoxysilylpropyl polysulfide having" to -- (e.g. a bis (3-triethoxysilylpropyl polysulfide) having --.

Column 5,
Line 31, change "tetrathiodipronionic" to -- tetrathiodipropionic --.
Line 31, change "trithiodinropionic" to -- trithiodipropionic --.

Signed and Sealed this

Twentieth Day of April, 2004

JON W. DUDAS
*Acting Director of the United States Patent and Trademark Office*